United States Patent
Williamson et al.

(10) Patent No.: US 10,807,885 B1
(45) Date of Patent: Oct. 20, 2020

(54) LOW ENERGY NITROGEN REMOVAL WETLAND TECHNOLOGY

(71) Applicant: Clean Water Services, Hillsboro, OR (US)

(72) Inventors: Kenneth J. Williamson, Hillsboro, OR (US); Jamie Hughes, Hillsboro, OR (US); David Austin, Mendota Heights, MN (US); Scott Wallace, Raleigh, NC (US)

(73) Assignee: CLEAN WATER SERVICES, Hillsboro, OR (US)

( * ) Notice: Subject to any disclaimer, the term of this patent is extended or adjusted under 35 U.S.C. 154(b) by 996 days.

(21) Appl. No.: 14/887,236

(22) Filed: Oct. 19, 2015

Related U.S. Application Data (60) Provisional application No. 62/068,478, filed on Oct. 24, 2014.

(51) Int. Cl.
*C02F 1/28* (2006.01)
*C02F 101/16* (2006.01)

(52) U.S. Cl.
CPC ......... *C02F 1/281* (2013.01); *C02F 2101/16* (2013.01); *Y02W 10/18* (2015.05); *Y10S 210/903* (2013.01)

(58) Field of Classification Search
None
See application file for complete search history.

(56) References Cited

U.S. PATENT DOCUMENTS

| | | | |
|---|---|---|---|
| 681,884 A | 9/1901 | Monjeau | |
| 6,200,469 B1 * | 3/2001 | Wallace | C02F 3/00 210/150 |
| 6,811,700 B2 * | 11/2004 | Austin | C02F 3/06 210/151 |
| 6,830,688 B2 * | 12/2004 | Austin | C02F 3/06 210/170.01 |

(Continued)

OTHER PUBLICATIONS

Korkusuz et al., Comparison of the treatment performances of blast furnace slag-based and gravel-based vertical flow wetlands operated identically for domestic wastewater treatment in Turkey, 2005, Ecological Engineering, vol. 24, pp. 187-200 (Year: 2005).*

(Continued)

*Primary Examiner* — Bobby Ramdhanie
*Assistant Examiner* — Michael J An
(74) *Attorney, Agent, or Firm* — Buchalter (57) ABSTRACT

A low energy nitrogen removal wetland system is disclosed to provide high rates of nitrogen removal treatment for wastewater with low energy requirements. The wetland system uses down-flow rock-filled wetlands for nitrogen removal. The system has no aeration requirements, thus resulting in low energy consumption. The wetland system comprises a first column receiving drainage influent, a mid-level reservoir, a second column receiving drainage from the mid-level reservoir and a lower level reservoir receiving discharge from the second column. The first and the second columns are filled with media layers comprise rock media with ammonia adsorption capacity for ammonia removal. The wetland system operates in a flood and drain operation mode or a continuous flow mode.

13 Claims, 8 Drawing Sheets

(56) References Cited

U.S. PATENT DOCUMENTS

| | | | | |
|---|---|---|---|---|
| 6,858,142 | B2* | 2/2005 | Towndrow | C02F 3/006 210/150 |
| 6,881,338 | B2* | 4/2005 | Austin | C02F 3/327 210/170.01 |
| 7,510,649 | B1* | 3/2009 | Lavigne | C02F 3/046 137/883 |
| 8,673,152 | B2* | 3/2014 | Smith | C02F 1/001 210/660 |
| 9,764,974 | B2* | 9/2017 | Chai | C02F 3/302 |
| 2010/0059438 | A1* | 3/2010 | Bottcher | C02F 1/004 210/610 |
| 2010/0300964 | A1* | 12/2010 | Lytle | C02F 3/06 210/615 |
| 2011/0100905 | A1* | 5/2011 | Ahn | C02F 1/42 210/608 |
| 2011/0297596 | A1* | 12/2011 | Hondulas | C02F 3/109 210/170.05 |
| 2011/0303609 | A1* | 12/2011 | Isovitsch Parks | B01J 20/0229 210/663 |
| 2014/0061124 | A1* | 3/2014 | Michel | C02F 3/1215 210/602 |
| 2015/0151996 | A1 | 6/2015 | Collison | |

OTHER PUBLICATIONS

Austin, David, "Infuence of cation exchange capacity (CEC) in a tidal flow, flood and drain wastewater treatment wetland," Ecological Engineering 28:35-43 (2006).

Liu et al., "How substrate influences nitrogen transformations in tidal flow constructed wetlands treating high ammonium wastewater?" Ecological Engineering 73:478-489 (2014).

* cited by examiner

FIG. 7(b) Flood and Drain mode

FIG. 7(a) Continuous flow mode

FIG. 8

LOW ENERGY NITROGEN REMOVAL WETLAND TECHNOLOGY

CROSS-REFERENCE TO RELATED APPLICATION

This application claims the benefit of U.S. Provisional Patent Application No. 62/068,478, filed Oct. 24, 2014, the disclosure of which is incorporated herein by reference.

TECHNICAL FIELD

This description relates generally to wastewater treatment and, in particular, to methods, systems for nitrogen treatment for wastewater containing ammonia-nitrogen using a vertical flow wetland system.

BACKGROUND

Effluent discharges from wastewater sources can contain pollutants, such as ammonia and nitrogen, which need to be treated before the effluent can be released. Typically a waste treatment plant may be used to treat waste water effluent. Such plants typically require energy input and may otherwise not been seen as environmentally friendly. However, the use of natural treatment of such effluents may be increasingly desirable for ecological reasons, although such natural processes may be slow in comparison to carrying out such a process in a treatment plant. Unfortunately, such natural systems often require large tracts of land and may be slow to process wastewater.

In processing waste water discharges, typically a nitrification process is the first sub-process used to remove ammonia, where the ammonia is first transformed to a nitrite, and finally to a nitrate. The removal of nitrogen may be characterized as a nitrification/denitrificaton process. One way to manage nitrogen pollutants with the above mentioned processes is with the use of constructed wetlands, rather than in a treatment plant. Nitrogen species in constructed wetlands can be transformed by bacterial processes including nitrification, denitrification and anaerobic ammonia oxidation. For ammonia removal, nitrification is typically the first sub-process in the overall process. The removal of ammonia in a wetland is typically dependent upon the configuration of the wetland and the availability of dissolved oxygen (DO) utilized in the stages of the nitrogen treatment system.

The transition of nitrogen from one phase to another may be referred to as the nitrogen cycle. Ammonia combines with organic materials to create ammonium ($NH_4+$). Ammonium is converted to nitrite ($NO_2-$) and further to nitrate ($NO_3-$), typically in the presence of ammonia-oxidizing bacteria (AOB) and nitrite-oxidizing bacteria (NOB). These two reactions are collectively called nitrification. The nitrate can be removed by denitrification or anaerobic ammonia oxidation (Anammox). These processes can be carried out naturally, but to be commercially useful on a large enough scale, it may be desirable to sometimes artificially construct a wetland that tends to aid the wastewater treatment process.

Thus there may be a need for such an artificially constructed wetland that tends to increase the rates of nitrification and denitrification treatment for wastewater with decreased treatment costs and lower energy requirements.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a low energy nitrogen removal wetland system that provides high rates of nitrogen removal treatment for wastewater with low energy requirements. The wetland system uses down-flow rock-filled wetlands to carry out nitrogen removal. The system has no aeration requirements, thus resulting in low energy consumption. After nitrification, the oxidized ammonia as nitrite or nitrate can be removed in anaerobic or anoxic zones in the wetland.

In some examples, the wetland system comprises a first column receiving drainage influent, a mid-level reservoir receiving drainage from the first column, a second column receiving drainage from the mid-level reservoir and a lower level reservoir receiving discharge from the second column, and providing effluent via a drain. The first column is filled with a first plurality of filter media layers and the second column is filled with a second plurality of filter media layers. The first and/or the second plurality of filter media layers comprise rock media with ammonia adsorption capacity, preferably greater than 25 g ammonia N per cubic meter. The filter rock media are selected from STALITE™, UTELITE™, bend cinder, basalt, crushed rock, and steel slag, etc.

In some examples, the filter media may be topped with fine particles within the first and/or second column and a variety of selected wetland plants may grow on top of the fine particles to provide functionality of additional wastewater ponding and nutrient removal.

In some examples, the wetland system operates in a flood and drain mode or a continuous vertical flow mode. In the flood and drain mode, the first and second columns are dosed with plant effluent water at a designated hydraulic loading rate (HLR) until the filter media is completely submerged. Once the media is fully submerged, the column is drained rapidly. Pumps may be utilized to facilitate the rapid drainage process. The rapid drainage replenishes the oxygen in the treatment layer and induces desorption of ammonia from the filter media. The rapid drainage also provides the ammonia-oxidizing bacteria with the necessary oxygen and ammonia to facilitate nitrification. Frequency of flood and drain cycles may be configurable, such as varying from once per 2 hours to once per 24 hours. In the continuous vertical flow mode, the effluent water is dosed into the first/second columns continuous with a configurable flow rate. In some examples, the effluent water may be dosed into the first/second columns via a pair of siphon boxes disposed between a head tank and the first/second columns. The second column may be anaerobic or anoxic to support denitrification.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a low energy nitrogen removal wetland system that provides sufficiently high rates of nitrogen removal treatment for wastewater with low energy requirements to be useful commercially. Although the present examples are described and illustrated herein as being implemented in a pilot wetland system for nitrification, the system described is provided as an example and not a limitation to large scale implementation of nitrification and denitrification. As those skilled in the art will appreciate, the present examples are suitable for application in a variety of different types of constructed wetland systems.

The low energy nitrogen removal wetland system provides high rates of nitrification treatment for wastewater with low energy requirements. The wetland system advantageously uses down-flow rock-filled wetlands for nitrification/denitrification. The system has no aeration requirements, and thus results in low energy consumption. Although dimensions are shown in some of the figures that follow, they are meant to be exemplary and are not intended to be a limitation.

Figure 1:
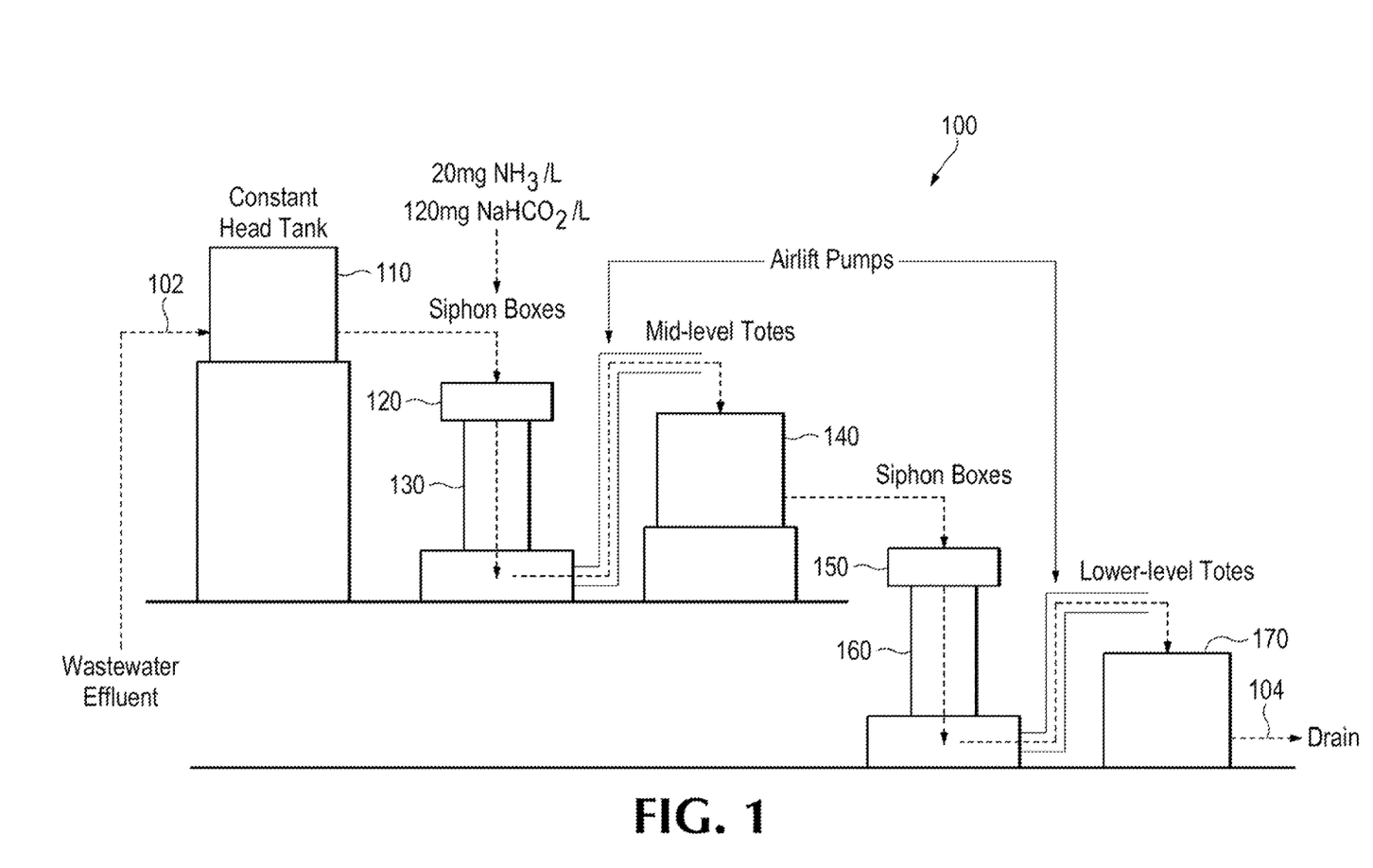
FIG. 1 shows a schematic view of the wetland system.

FIG. 1 shows a schematic view of the wetland system 100. The wetland system includes a first column 130 receiving drainage influent, a mid-level reservoir 140 receiving drainage from the first column, a second column 160 receiving drainage from the mid-level reservoir 140 and a lower level reservoir 170 receiving discharge from the second column, and providing effluent via a drain 104. The first column is filled with a first plurality of filter media layers and the second column is filled with a second plurality of filter media layers. The first and/or the second plurality layers of filter media include rock media with ammonia adsorption capacity, preferably greater than 25 g ammonia N per cubic meter. The filter rock media are selected from STALITE™, UTELITE™, bend cinder, basalt, crushed rock, and steel slag, etc. The filter media layers within the first column and the filter media layers within the second column may or may not be the same.

In some examples, the first column 130 receives drainage influent 102 via a head tank 110 and a first siphon box 120; and the second column 160 receives drainage from the mid-level reservoir 140 via a second siphon box 150. The first and second siphon boxes may be used as a means for drainage dosing control at a desired dosage volume.

In some examples, the mid-level reservoir 140 is placed at a height above the first column 130 and an extra device, such as an airlift pump, may be utilized to pump drainage from the first column 130 to the mid-level reservoir 140. Similarly, another airlift pump may be utilized to pump drainage from the second column 160 to the lower level reservoir 170.

For wetland system performance testing purposes, ammonia at an approximate concentration of 20 mg $NH_3$-N/L and alkalinity at an approximate concentration of 120 mg $NaHCO_3$/L are added to the wastewater effluent in the first siphon box that dosed the first column.

Although the wetland system shown in FIG. 1 has a serial two-stage setup with each stage comprising a column and a reservoir, it is contemplated that equivalent examples may incorporate various changes, such as adding more stages, arranging the stages in parallel, constructing a wetland system with combination of serial and parallel stages, operating the second stage in an anaerobic or anoxic state by submergence.

Figure 2:
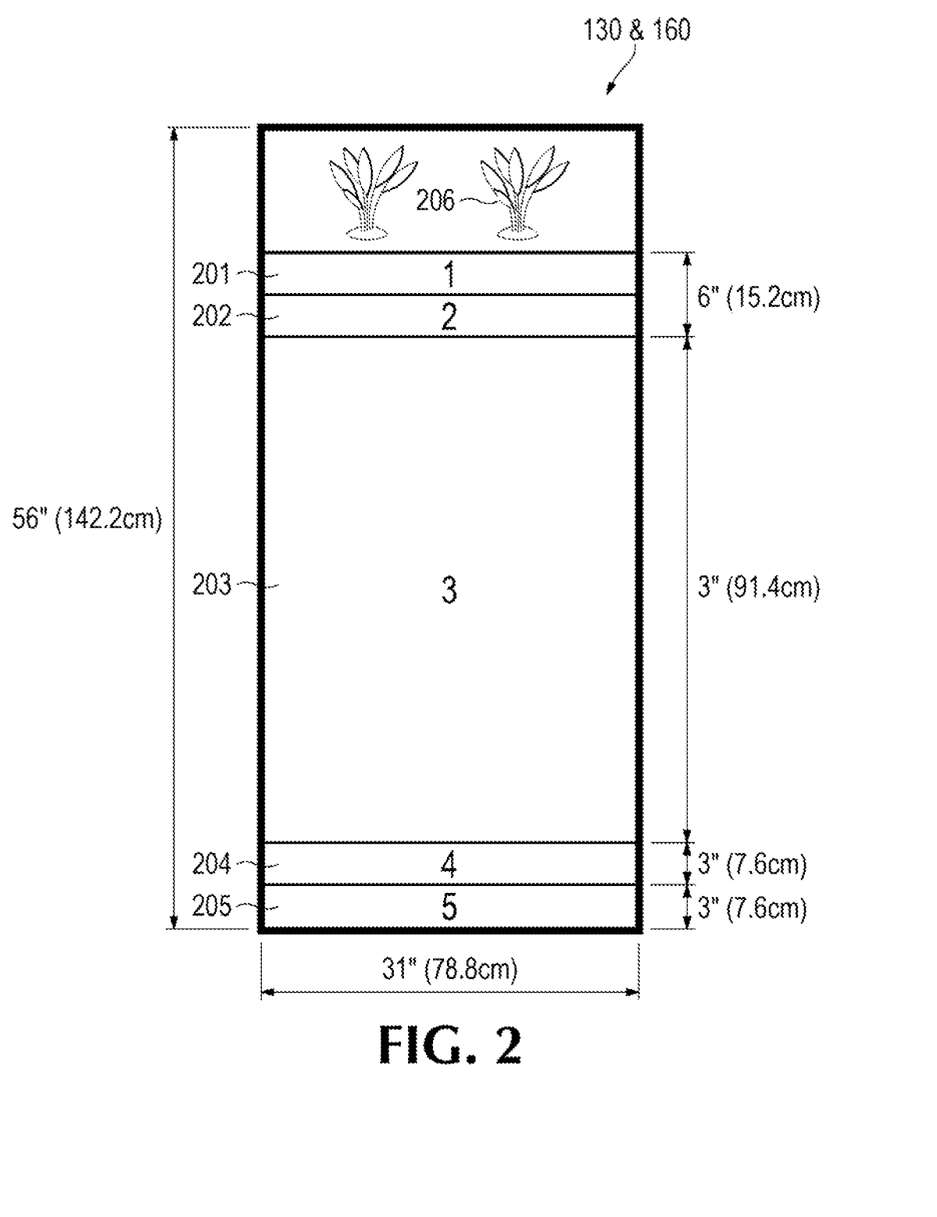
FIG. 2 shows a structure view of a column for the wetland system.

FIG. 2 shows a structure view of a column for the wetland system. The column shown may be referred as the first column 130 or the second column 160. The column may be filled with a first plurality of filter media layers. As shown in FIG. 2, five media layers 201~205 are utilized. The treatment media layer may be disposed in the middle of the column as a third media layer 203, with the first and second media layers 201-202 on the top and the fourth and fifth media layers 204-205 beneath. The treatment media layer 203 usually occupies a majority of the column volume. In some examples, the first, second, fourth and fifth media layers 201,202, 204-205 all may have the same volume or filter height. The filter media layers include rock media with ammonia adsorption capacity, preferably greater than 25 g ammonia N per cubic meter. The filter rock media are selected from STALITE™, UTELITE™, bend cinder, basalt, crushed rock, and steel slag, etc. In some examples, a variety of selected wetland plants 206 may grow on top of the fine particles (the first media layer) to provide functionality of additional wastewater ponding and nutrient removal.

Figure 3:
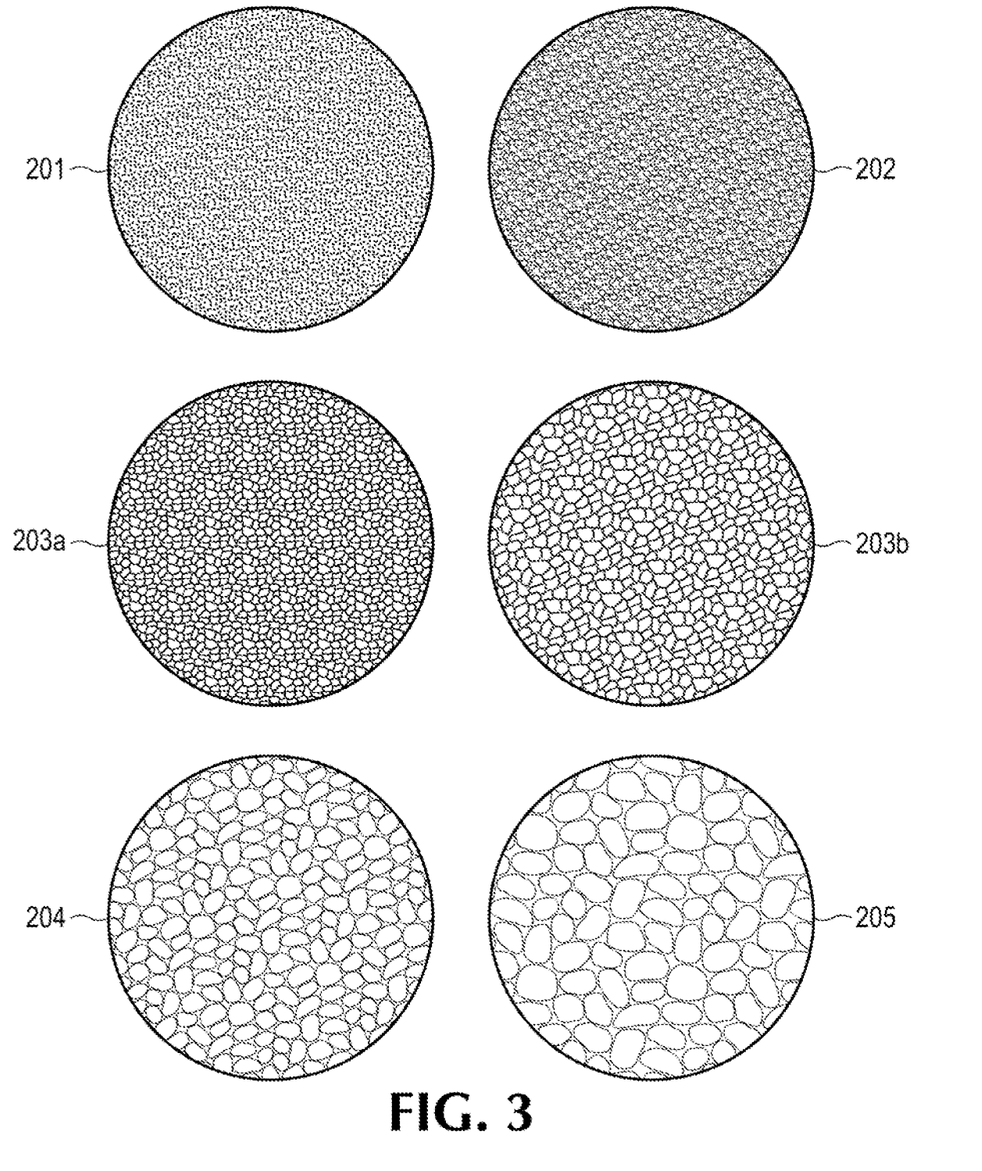
FIG. 3 shows exemplary filter media used for the column.

FIG. 3 shows exemplary filter media used for the column. The average grain size for the filter media increases from the top (first) media layer 201 to the bottom (fifth) media layer 205. The first media layer 201 has the finest grain (typically a 1/16 to 1/8" diameter, and for example the grain size of typical soil capable of supporting plant growth) and the second media layer 202 has the second finest grain (typically a 1/8" to 1/4" diameter). The first and second media layers together function as a top dressing for the third media layer 203 (typically 1/4" to 1/2" diameter). The third media layer 203 includes rock media with ammonia adsorption capacity, preferably greater than 25 g ammonia N per cubic meter. The rock media in the third media layer 203 may be a river run as shown as 203a or crushed basalt as shown as 203b. In some examples, the rock media in the fourth media layer 204 is a river rock. The rock media in the fifth media layer 205 is a drainage cobble. A variety of selected wetland plants may grow on top of the fine particles to provide functionality of additional wastewater ponding and nutrient removal. Fluorescent grow lights are also utilized to provide up to 14 hours of light for the wetland plants every day.

Besides the multiple layers of filter media, the columns also include microorganisms, which may be introduced through natural or other means. The microorganisms may include but are not limited to nitrobacter, nitrosomonas, other nitrifying bacteria, ammonia-oxidizing bacteria (AOB) and nitrite-oxidizing bacteria (NOB), Anammox bacteria, etc. These bacteria have been shown to grow in this system over the temperature range of wastewater from substantially 5 to 27 degrees Celsius. In the presence of those bacteria, ammonium is converted to nitrite ($NO_2-$) and further to nitrate ($NO_3-$) and the nitrite or nitrate are reduced to nitrogen gas. Specifically, those bacteria may help to stabilize the nitrogen removal process. The rock media and the fine particles within the column may function as an environmental substrate to which the bacteria attach.

Although the column shown in FIG. 3 has 5 media layers altogether, it will be obvious to those skilled in the art to make various changes, such as adding more media layers, simplifying the construction with reduced numbers of media layers, etc.

Figure 4:
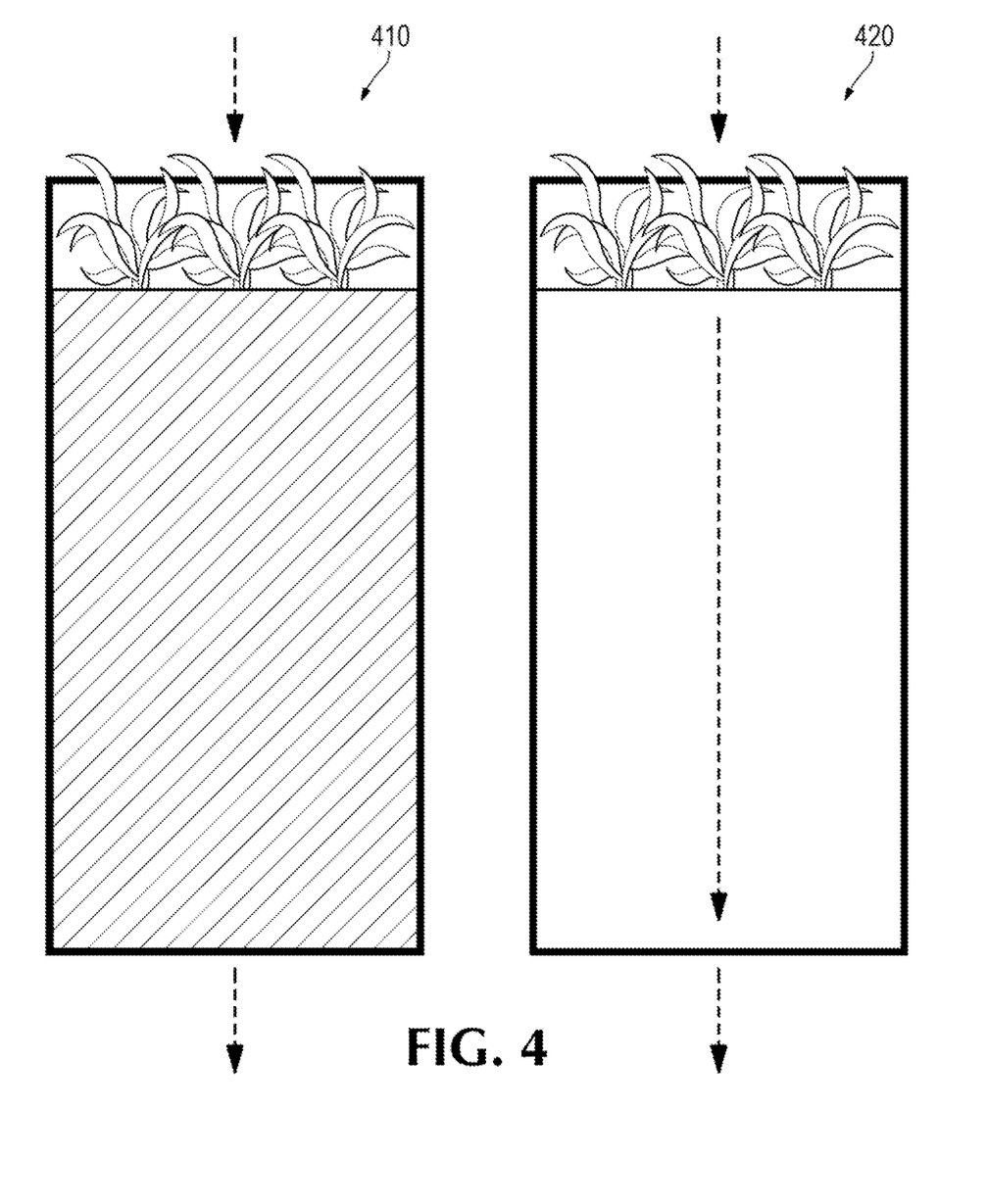
FIG. 4 shows a comparison between a flood and drain operation mode and a continuous flow mode.

The wetland system may operate in a flood and drain or a continuous flow mode. FIG. 4 shows a comparison between a flood and drain operation mode and a continuous flow mode. In the flood and drain mode 410, the first and second columns are dosed with plant effluent water at a designated hydraulic loading rate (HLR) until the filter media is completely submerged. Once the media is fully submerged, the column is drained rapidly. Airlift pumps may be utilized to facilitate the rapid drainage process. The Airlift pumps may be activated by a pressure switch, which can be calibrated according to the hydraulic pressure when the column is filled. The rapid drainage replenishes the oxygen in the treatment layer and induces desorption of ammonia from the filter media. The rapid drainage also provides the ammonia-oxidizing bacteria with the necessary oxygen and ammonia to facilitate nitrification. Average ammonia removal performance for the Nitrification Wetlands pilot system for two, 3-ft columns operating in series is summarized in Table 1. Frequency of flood and drain cycles may be configurable, such as varying from once per 2 hours to once per 24 hours.

In the continuous flow mode 420, effluent water is dosed into the first/second columns continuous with a configurable flow rate. The effluent water may be dosed into the first/second columns via the siphon boxes 120 or 150 disposed between a head tank and the first/second columns.

Table 1 shows a summarization of average ammonia removal performance for the pilot nitrification wetlands system using two, 3-ft columns operating in series for HRLs of 1, 2, 4 and 8 $m^3$/day. The rock media types in Table 1 are referred to as Knife River round rock from the Knife River (KR) and Waldport Marine Basalt (W). The Knife River round rock is river-run aggregate from Willamette River deposits. The Waldport Marine Basalt (hereafter Waldport) is a light-weight crushed aggregate from uplift marine sediments. The two aggregates are different in texture, ammonia adsorption capacity and specific gravity.

As shown in Table 1, the exemplary pilot nitrification wetlands system significantly lowers the $NH_3$ concentration in both flood and drain operation mode and continuous flow operation mode, under all the tested hydraulic loading rates (HLRs).

TABLE 1

Average ammonia concentrations in the influent and effluent of the wetland system under different hydraulic loading rates (HLRs)

| | | NH concentration (mg/L) | | | |
| --- | --- | --- | --- | --- | --- |
| | | Flood and Drain | | Continuous | |
| HLR | Media Type | Influent | Effluent | Influent | Effluent |
| 1 | W | 16.9 | .03 | 16.2 | 0.1 |
| | KR | 13.7 | .08 | 16.2 | 1 |
| 2 | W | 23.7 | <0.1 | 24.7 | 0.5 |
| | KR | 25.5 | 0.2 | 25.6 | 3.5 |
| 4 | W | 23.1 | 0.6 | 18 | 0.2 |
| | KR | 24.3 | 3 | 18.7 | 0.2 |
| 8 | W | 19.6 | 0.2 | 18.4 | 0.2 |
| | KR | 19 | 0.5 | 18.6 | 2.4 |

Figure 5A:
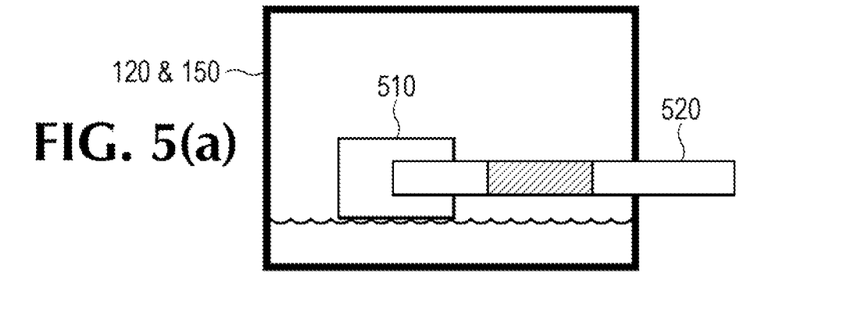
FIGS. 5(a) through 5(d) shows a flout dosing box used for flow control.
Figure 5B:
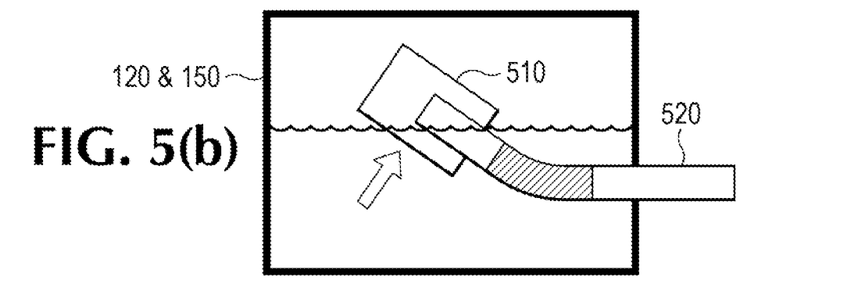
Figure 5C:
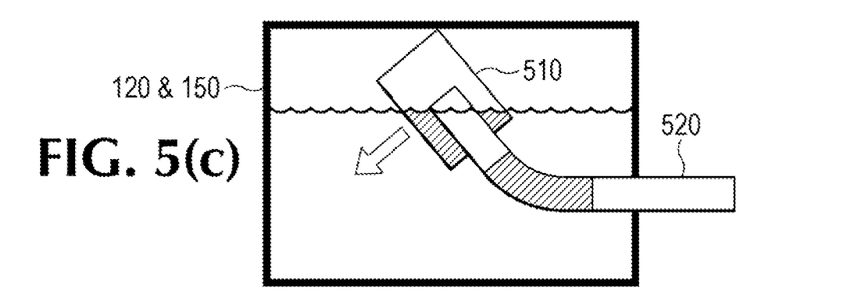
Figure 5D:
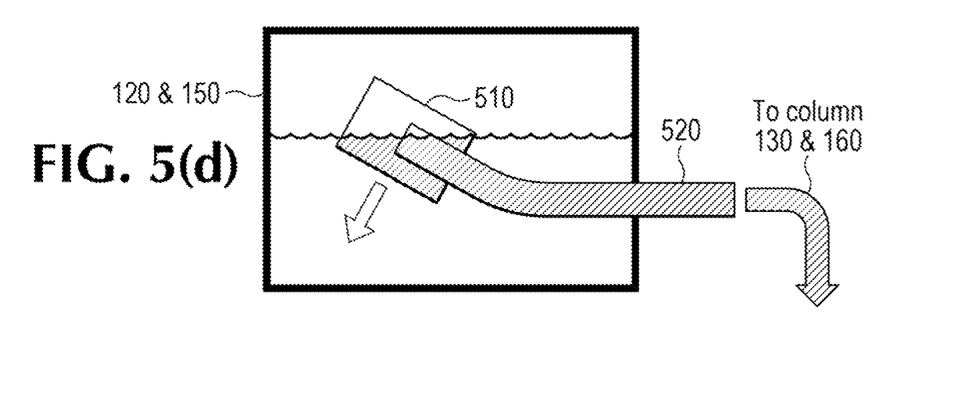

FIGS. 5(a) through 5(d) shows a flout dosing box used for flow control. The flout dosing box 510 may be disposed inside a siphon box 120 or 150. The flout dosing box 510 has an open top or at least a partially open top to allow drainage, filling the dosing box. The flout dosing box 510 can include a discharge conduit 520 to allow drainage within the flout dosing box being discharged outside of the siphon box. The discharge conduit 520 can be flexible to allow the flout dosing box 510 being able to float on drainage within the siphon box as shown in FIG. 5(a). As the siphon box starts to receive drainage, the flout dosing box 510 rises as shown in FIG. 5(b). When the drainage starts to fill the flout dosing box 510, the flout dosing box 510 sinks, as shown in FIG. 5(c). The drainage within the flout dosing box 510 is drained out of the siphon box through the discharge conduit 520, as shown in FIG. 5(d). The process then goes back to FIG. 5(b) for more cycles of drainage filling and discharge. Such an arrangement would be used to control a drainage filling pattern to column 130 and/or 160. Although the flout dosing box is utilized as shown in FIG. 5, other equivalent mechanical or electrical devices, such as mass flow meters or programmable switches, may be utilized for a desired drainage filling pattern.

Figure 6:
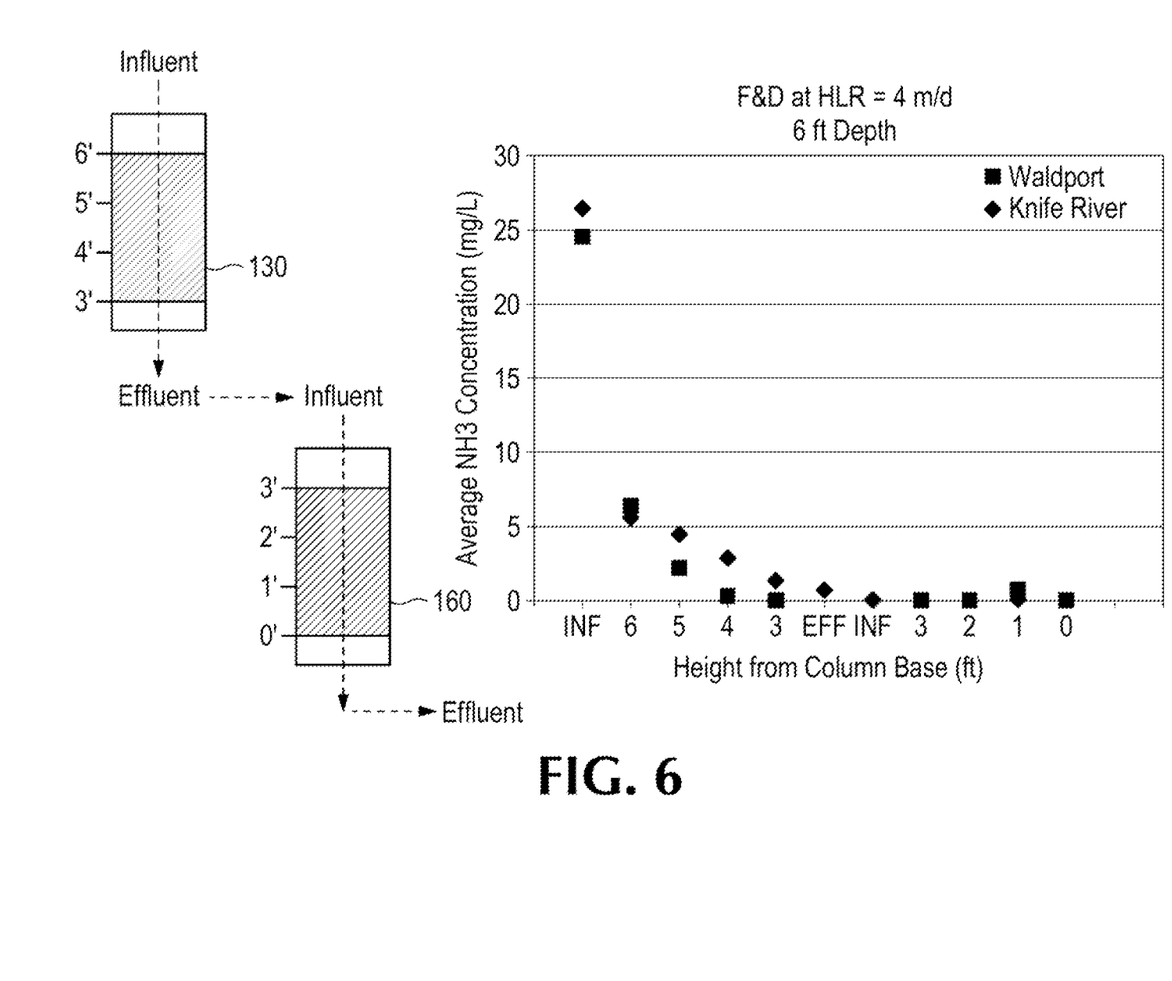
FIG. 6 shows average ammonia concentration at different positions within the filter column of a pilot wetland system.

FIG. 6 shows average ammonia concentration at a different position within the filter column of a pilot wetland system. The measurements are taken with the pilot nitrification wetlands system using two, 3-ft columns operating a flood and drain mode under HLR of 4 $m^3$/day. Again, the rock media types in FIG. 6 are referred as Knife River round rock from the Knife River and Waldport. The first column 130 and the second column 160 altogether compose an effective treatment height of 6'. Both the first column 130 and the second column 160 have side valves along different heights for drainage sampling. FIG. 6 clearly shows that the average NH) concentration decreasing steady from 5 mg/L at the top (corresponding to 6' effective height) to almost 0 mg/L at the bottom (corresponding to 0' effective height).

Figure 7A:
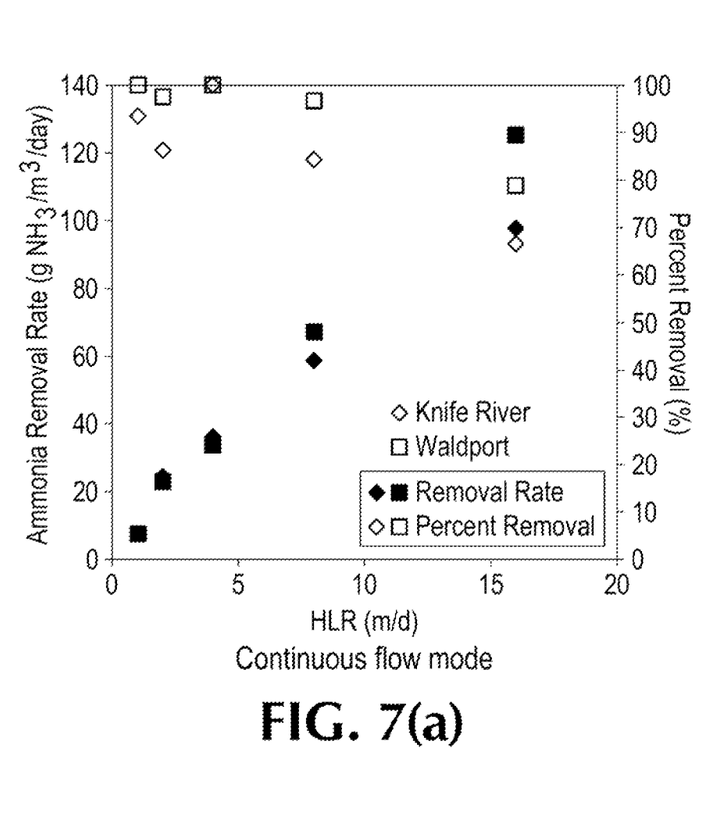
FIGS. 7(a) and 7(b) shows ammonia removal rates of a pilot wetland system under different hydraulic loading rates.
Figure 7B:
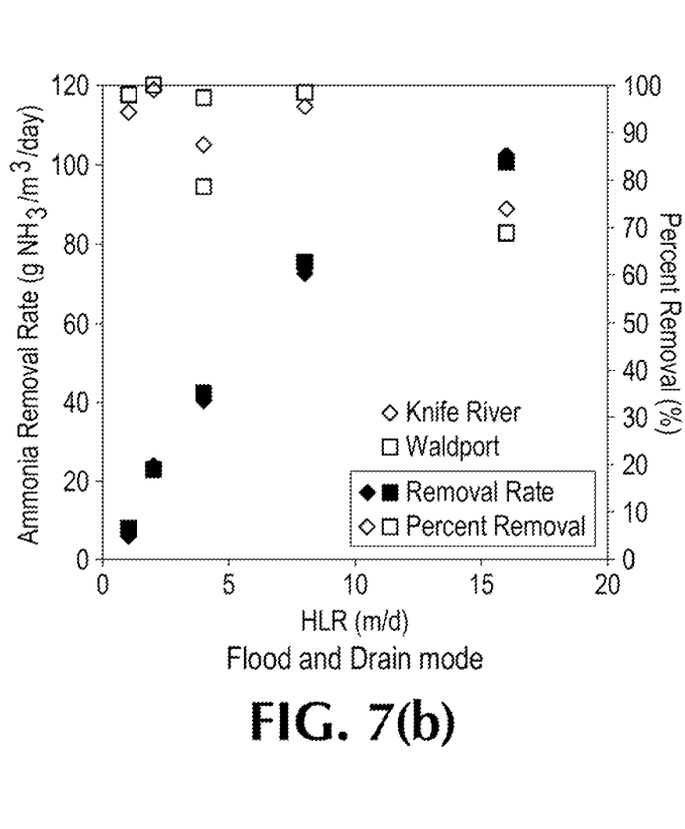

FIGS. 7(a) and 7(b) shows ammonia removal rates of a pilot wetland system under different hydraulic loading rates (HLRs). Similar to FIG. 6, the measurements are taken with the pilot nitrification wetlands system using two, 3-ft columns. The wetlands system operates in a flood and drain mode and a continuous flow mode for comparison under various HLRs ranging from 1 to 16 $m^3$/day. The rock media types in FIG. 7 are still using Knife River round rock from the Knife River and Waldport. The measurement result shown in FIG. 7 verifies high ammonia removal performance of the pilot wetland system, with actual ammonia removal rate (g $NH_3/m^3$/day) increased in pace with higher HLRs. The percentage of ammonia removal remains around 70% or higher for both flood and drain mode (FIG. 7(b)) and continuous flow mode (FIG. 7(a)). The percentage of removal drops from almost 100% at low HLRs to around 70% at HLR of 16 m$^3$/day, which might be due to the relative small volume size of the column for high HLRs. A scaled-up wetland system may be necessary to treat drainage under higher HLR to achieve comparable ammonia removal percentage under low HLRs.

Figure 8:
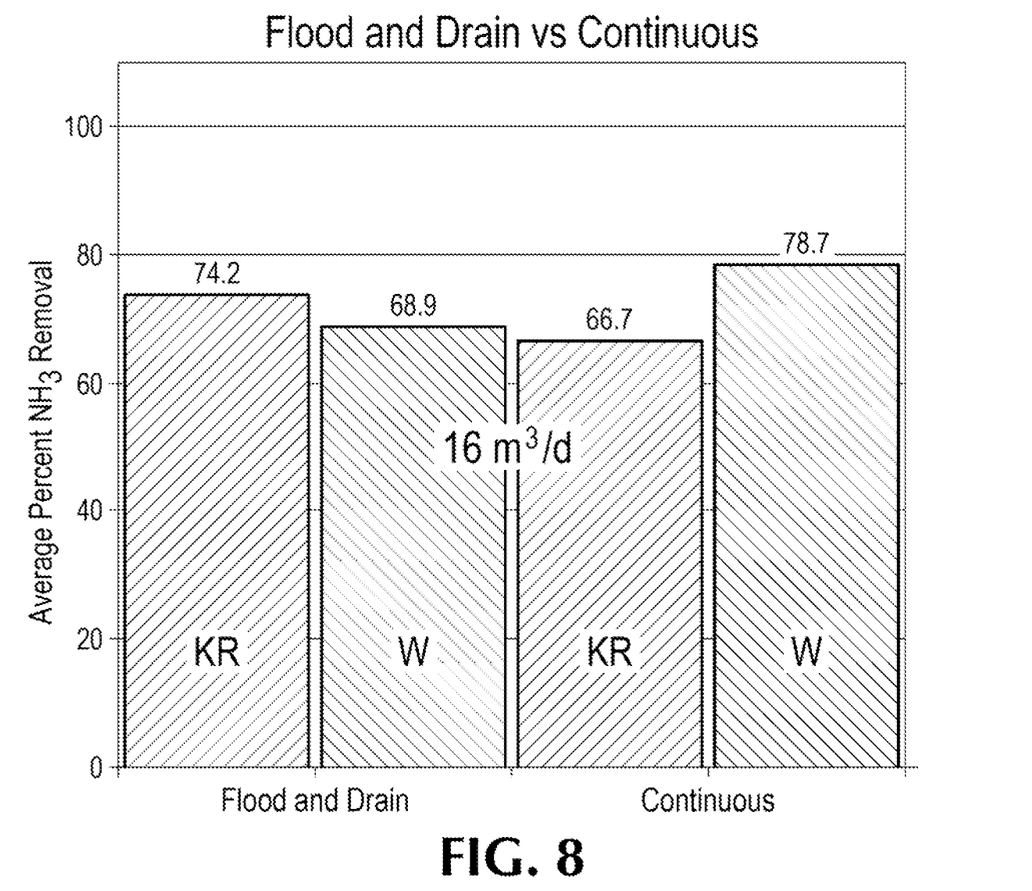
FIG. 8 shows a comparison of average ammonia removal percentages of the pilot wetland system between a flood and drain operation mode and a continuous operation mode.

The detailed numeric average ammonia removal percentages of the pilot wetland system under HLR of 16 m$^3$/day are shown in FIG. 8. With Knife River round rock media, the pilot wetland system achieves 74.2% ammonia removal percentage in the flood and drain mode and 66.7% ammonia removal percentage in the continuous flow mode. As a comparison, the pilot wetland system achieves 68.9% ammonia removal percentage in the flood and drain mode and 78.7% ammonia removal percentage in the continuous flow mode with Waldport medium. The pilot wetland system performs better in flood and drain mode with Knife River medium. On the contrary, the pilot wetland system shows higher ammonia removal percentage in continuous mode with Waldport media. It appears that different filter media have different optimum behavior under different operation. A systematic design of experiment may be necessary to identify an optimum operation mode and HLRs for a given filter rock.

It will be obvious to those skilled in the art to make various changes, alterations and modifications to the invention described herein. To the extent such changes, alterations and modifications do not depart from the spirit and scope of the appended claims; they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A system for nitrogen removal in wetlands comprising:
   a first column receiving drainage, the first column filled with a first plurality of layers of filter media having ammonia adsorption capacity;
   a mid-level reservoir receiving drainage from the first column;
   a second column receiving drainage from the mid-level reservoir, the second column filled with a second plurality of layers of filter media; and
   a lower level reservoir receiving discharge from the second column, and providing effluent via a drain, whereby nitrogen is removed from the effluent by the adsorption of ammonia, and wherein the first plurality of layers of filter media is rock having an ammonia adsorption capacity greater than 25 g ammonia N per cubic meter.

2. The system of claim 1 wherein the drainage flows downwardly within the first column.

3. The system of claim 1 wherein the drainage flows downwardly within the second column.

4. The system of claim 1 wherein the first plurality of layers of filter media and the second plurality of layers of filter media are selected from bend cinder, basalt, crushed rock, and steel slag.

5. The system of claim 1 wherein the first plurality of layers of filter media and the second plurality of layers of filter media are topped with fine particles of substantially 1/16th inch diameter to substantially 1/8$^{th}$ inch in diameter within the first column.

6. The system of claim 5 wherein the system further comprises wetland plants growing on top of the fine particles.

7. The system of claim 1 wherein the first column receives drainage in a continuous mode with drainage flowing continuously into and discharged from the first column at a designated hydraulic loading rate.

8. The system of claim 1 wherein the first column receives drainage in a flood and drain mode, in which the drainage is drained from the first column after the first plurality of layers of filter media are fully submerged by the drainage.

9. A method for nitrogen removal in wetlands comprising:
   receiving drainage inflow at a first column with the drainage flowing vertically within the first column, the first column filled with a first plurality of layers of filter media including rock media with ammonia adsorption capacity;
   receiving drainage from the first column at a mid-level reservoir;
   receiving drainage from the mid-level reservoir at a second column with the drainage flowing vertically within the second column, the second column filled with a second plurality of layers of filter media; and
   receiving discharge from the second column at a lower level reservoir, whereby nitrogen is removed from the effluent by the adsorption of ammonia, and wherein the first plurality of layers of filter media have ammonia adsorption capacity greater than 25 g ammonia N per cubic meter.

10. The method of claim 9 wherein the first plurality of layers of filter media and the second plurality of layers of filter media are selected from bend cinder, basalt, crushed rock, and steel slag.

11. The method of claim 9 wherein the first plurality of layers of filter media and the second plurality of layers of filter media are topped with fine particles of substantially 1/16th inch diameter to substantially 1/8$^{th}$ inch in diameter within the first column.

12. The method of claim 9 wherein the first column receives drainage inflow in a continuous mode with drainage flowing continuously into and discharged from the first column at a designated hydraulic loading rate.

13. The method of claim 9 wherein the first column receives drainage inflow in a flood and drain mode, in which the drainage is drained from the first column after the first plurality of layers of filter media are fully submerged by the drainage.

* * * * *